United States Patent
Tremblay

[19]

[11] Patent Number: 6,050,161
[45] Date of Patent: Apr. 18, 2000

[54] PORTABLE SINGLE-POINT BEVELING TOOL

[75] Inventor: Clement Tremblay, Citrus Heights, Calif.

[73] Assignee: Tri Tool Inc., Rancho Cordova, Calif.

[21] Appl. No.: 09/177,493

[22] Filed: Oct. 23, 1998

[51] Int. Cl.[7] ................................................. B23B 5/16
[52] U.S. Cl. ............................ 82/113; 82/128; 82/132; 82/136
[58] Field of Search .................... 82/113, 82, 83, 82/70.2, 72, 74, 132, 128, 136, 96, 100

[56] References Cited

U.S. PATENT DOCUMENTS

| | | | |
|---|---|---|---|
| 4,186,630 | 2/1980 | Lindhag | 82/113 |
| 4,207,786 | 6/1980 | Astle et al. | 82/113 |
| 4,677,884 | 7/1987 | Kwech et al. | 82/113 |
| 4,739,685 | 4/1988 | Ricci | 82/113 |
| 4,944,205 | 7/1990 | Ricci | 82/70.2 X |
| 5,189,933 | 3/1993 | Ricci | 82/113 |

*Primary Examiner*—Henry W. H. Tsai
*Attorney, Agent, or Firm*—Bacon & Thomas PLLC

[57] ABSTRACT

A portable single-point beveling tool includes a tool housing, an associated tool drive mechanism and a base member which is rotatably supported on the housing for rotary motion about a rotation axis and arranged to be rotated by the tool drive mechanism. The base member has a portion which extends in a generally radial direction with respect to the rotation axis. The base member carries a cutting tool holder assembly, which includes a cutting tool holder. The base member also carries a cutting tool feed assembly, which is arranged to simultaneously drive the cutting tool holder assembly in a linear radial direction and the cutting tool holder in a linear axial direction with respect to the rotation axis. Rotary motion of the base member actuates the cutting tool feed assembly to drive the cutting tool holder assembly and the cutting tool holder.

20 Claims, 7 Drawing Sheets

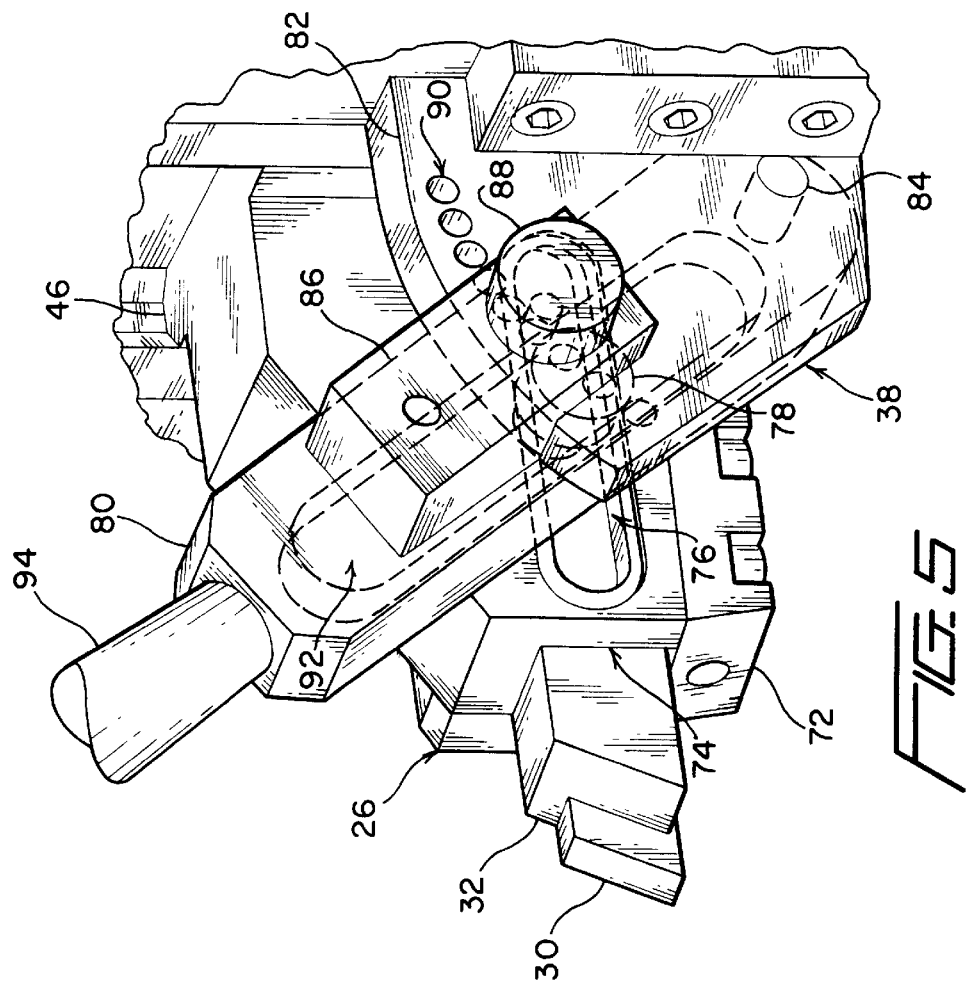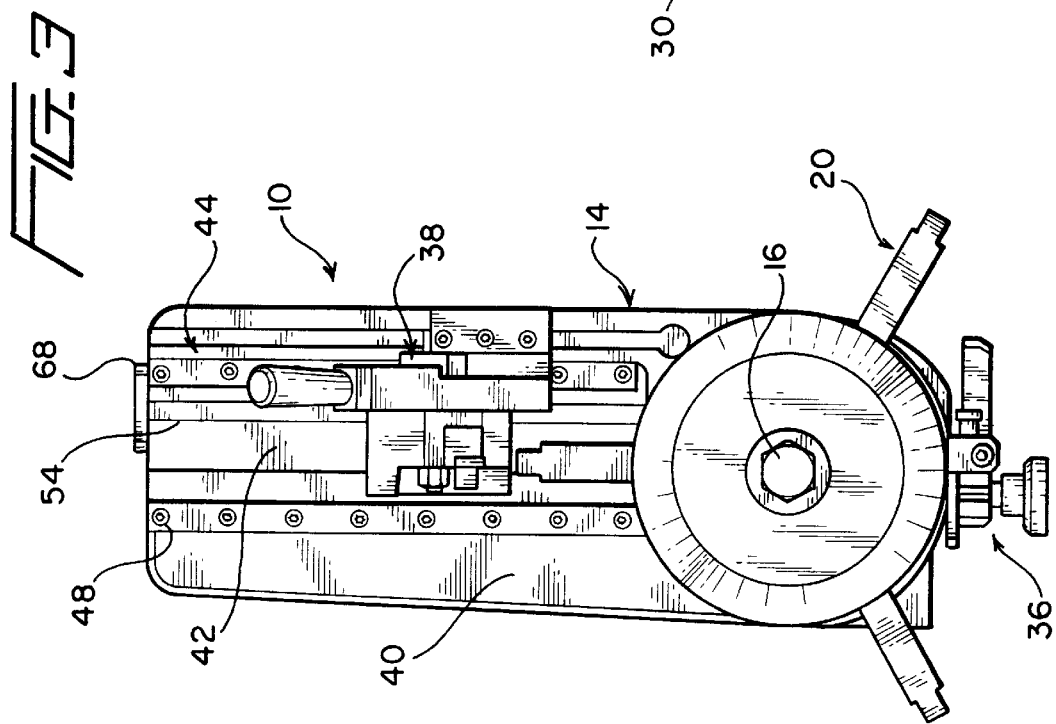

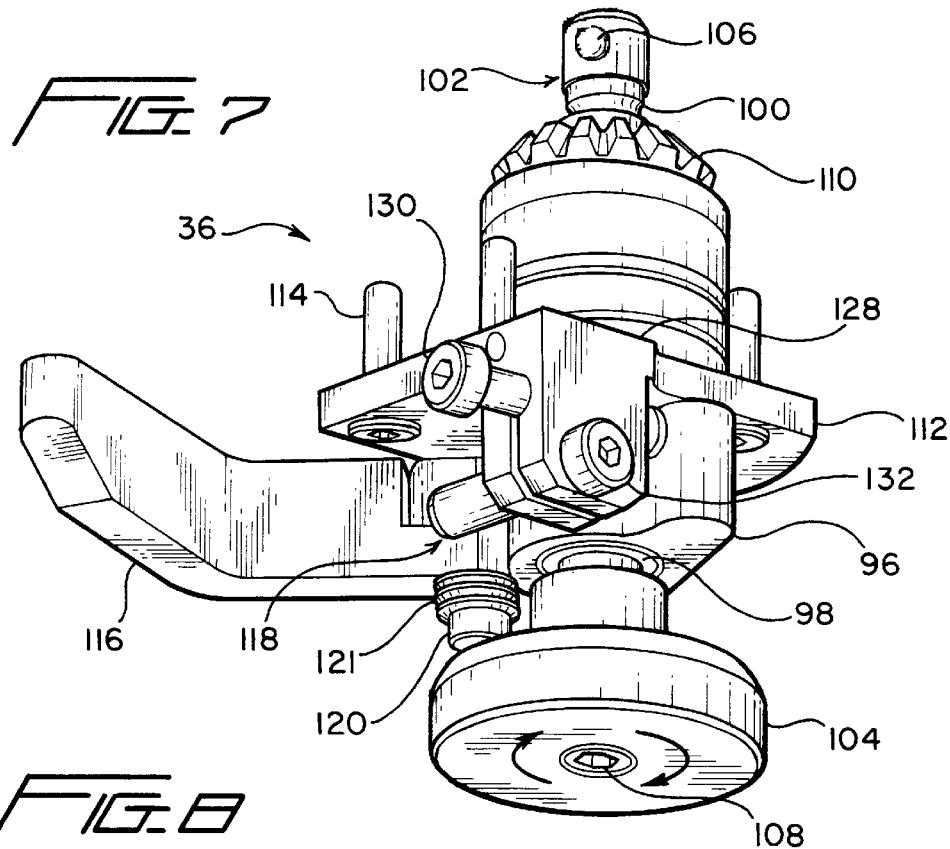
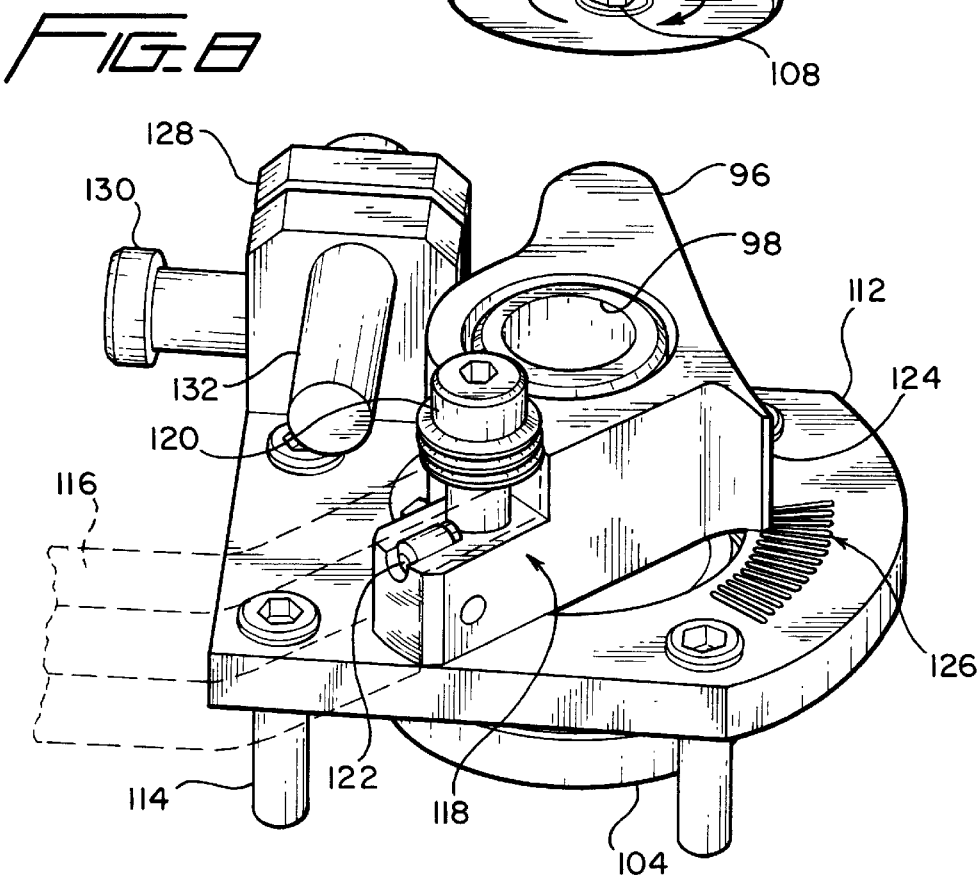

PORTABLE SINGLE-POINT BEVELING TOOL

BACKGROUND OF THE INVENTION

1. Field of the Invention

The present invention relates to a portable single-point machine tool for machining beveled faces on pipe ends and the like.

2. Discussion of the Related Art

Portable tools for machining bevel surfaces on pipes and the like are generally known and are used in the field where the use of a fixed machining tool is not appropriate or possible. Single-point tools, which usually are set up to trace a circular path with a rotating cutting tool while the cutting tool is moved radially in a plane generally transversely to the axis of rotation of the tool, are commonly used. Various commercial products are known which correspond to this general category of machine tools. A single-point bevelling tool, for example, must also move the cutting tool axially while it is guided radially and driven in rotation.

Portable single-point beveling tools constructed in accordance with the prior art, however, are generally complex, heavy structures which require a substantial amount of set-up time and are quite cumbersome. The prior art lacks a simple, yet effective system for guiding a single-point cutting tool to achieve a desired beveled surface on a workpiece.

SUMMARY OF THE INVENTION

The present invention provides a portable beveling tool that achieves single-point cutting of beveled surfaces on the ends of workpieces, for example pipes, using a unique cutting tool holder and a unique cutting tool feed assembly. The beveling tool is adapted to provide a variable beveling angle and a variable feed rate.

The portable single-point beveling tool comprises a tool housing, an associated tool drive mechanism and a base member which is rotatably supported on the housing for rotary motion about a rotation axis and arranged to be rotated by the tool drive mechanism. The base member has a portion which extends in a generally radial direction with respect to the rotation axis. The base member carries a cutting tool holder assembly, which includes a cutting tool holder. The base member also carries a cutting tool feed assembly, which is arranged to simultaneously drive the cutting tool holder assembly in a linear radial direction and the cutting tool holder in a linear axial direction with respect to the rotation axis. Rotary motion of the base member actuates the cutting tool feed assembly to drive the cutting tool holder assembly and the cutting tool holder. According to a preferred embodiment of the invention, the cutting tool feed assembly comprises a feed screw assembly, including a feed screw, and a feed lever assembly. In this embodiment, the feed lever assembly is selectably engageable with the feed screw assembly so as to rotate the feed screw a desired increment each time the feed lever assembly is actuated by rotary motion of the base member. The feed screw is rotatably connected to the cutting tool holder assembly such that rotation of the feed screw drives the cutting tool holder assembly in the linear radial direction.

According to another embodiment, the beveling tool includes a tracking plate assembly which is also carried by the base member. The tracking plate assembly includes a tracking plate having a tracking slot. An axial slot is formed on a side of the cutting tool holder assembly and a cam follower is connected to the cutting tool holder. The cam follower extends through the axial slot and into the tracking slot such that movement of the cam follower is constrained by the axial and tracking slots.

According to yet another embodiment, the beveling tool includes at least one feed lever actuator mounted on the tool housing. The feed lever actuator is positioned to actuate the feed lever assembly by contacting the feed lever during rotary motion of the base member and causing the feed lever to rotate a predetermined amount.

Other embodiments and the details of the invention will become evident upon review of the following detailed description.

BRIEF DESCRIPTION OF THE DRAWINGS

In order more fully explain the features and advantages of the present invention, the following preferred embodiments of a portable single point beveling tool according to the invention are described, as examples only without any limitative character, with reference to the accompanying drawings, in which:

FIG. 3 is an elevational front view of a beveling tool according to the invention;

FIG. 5 is an enlarged perspective view of a tracking plate assembly and a cutting tool holder according to the invention;

FIG. 7 is a perspective view of a feed lever assembly according to the invention;

FIG. 8 is a perspective view of a portion of the feed lever assembly according to FIG. 7 with the feed knob, feed shaft and outfeed gear omitted.

DETAILED DESCRIPTION OF THE PREFERRED EMBODIMENTS

Figure 1:
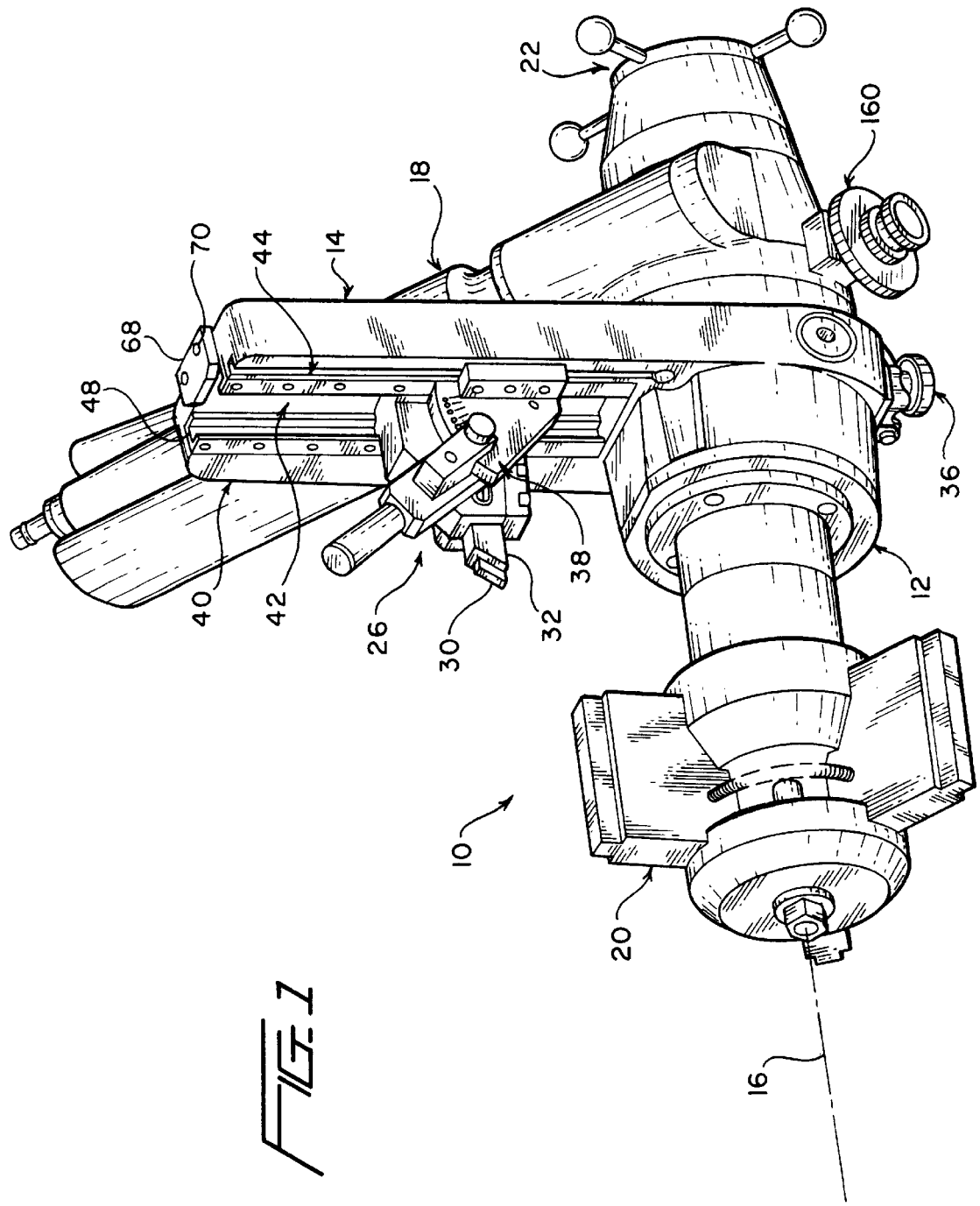
FIG. 1 is a perspective view of a beveling tool according to the invention.

FIG. 1 shows a perspective view of a portable single-point beveling tool 10 according to a preferred embodiment of the invention. Beveling tool 10 comprises a tool housing 12 arranged to support a base member 14 for rotation about a rotation axis 16. Base member 14, as illustrated, is elongated radially and may be mounted on tool housing 12 by any suitable means. Typically, a tool drive mechanism 18 is arranged to rotate base member 14 about rotation axis 16 relative to tool housing 12. Various tool drive mechanisms are well known in the art and no further description thereof is not necessary. An example of such a tool drive mechanism is disclosed in U.S. Pat. No. 4,665,782, which is hereinafter incorporated by reference in its entirety.

Figure 2:
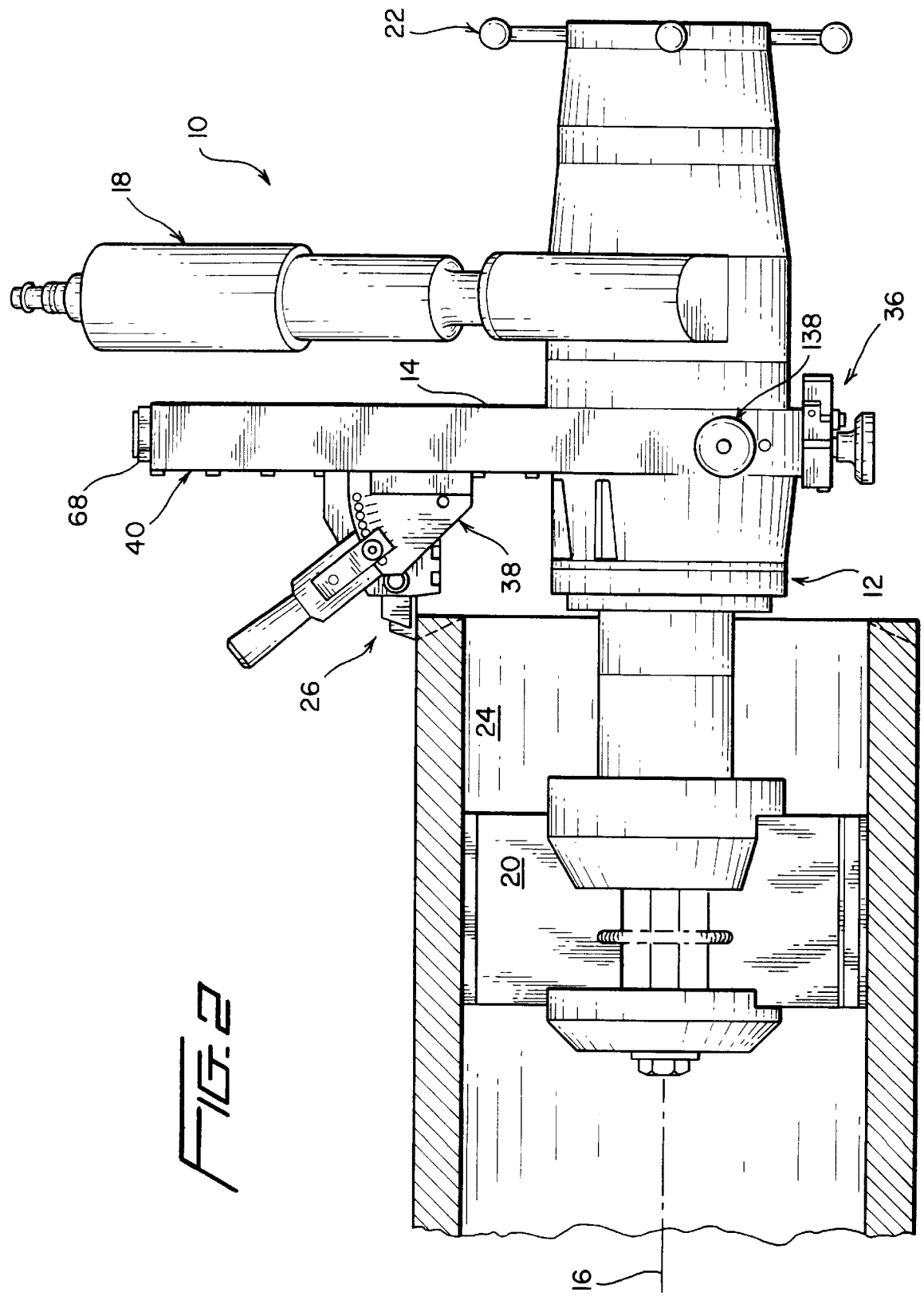
FIG. 2 is an elevational side view of a beveling tool according to the invention shown mounted at an end of a pipe.

In a preferred embodiment of the invention, beveling tool 10 is associated with a workpiece engaging mandrel 20. Mandrel 20 is manually operable from the opposite end of beveling tool 10 by a mandrel knob 22 to cause engagement of mandrel 20 with a hollow, annular workpiece, for example, a pipe 24 as shown in FIG. 2. Such mandrels are well known in the art and any suitable mandrel means could be utilized in association with the present invention. As such, no further description thereof is provided. While beveling tool 10 is shown with mandrel 20, it will be understood that beveling tool 10 may function without a mandrel when the workpiece is independently supported relative to the tool.

Associated with base member 14 and carried thereby are a cutting tool holder assembly 26 and a cutting tool feed assembly 28. A cutting tool 30 is held by a cutting tool holder 32 which forms a part of the cutting tool holder assembly 26. The cutting tool feed assembly 28, as will be described hereinafter, is arranged to simultaneously drive the cutting tool holder assembly 26 in a liner radial direction and cutting tool holder 32 in a liner axial direction with respect to rotation axis 16.

According to a preferred embodiment, the cutting tool feed assembly 28 includes a feed screw assembly 34 and a feed lever assembly 36. Also, beveling tool 10 preferably includes a tracking plate assembly 38 which is also carried by base member 14. An exploded perspective view of the various assemblies is shown in FIG. 4.

Figure 4:
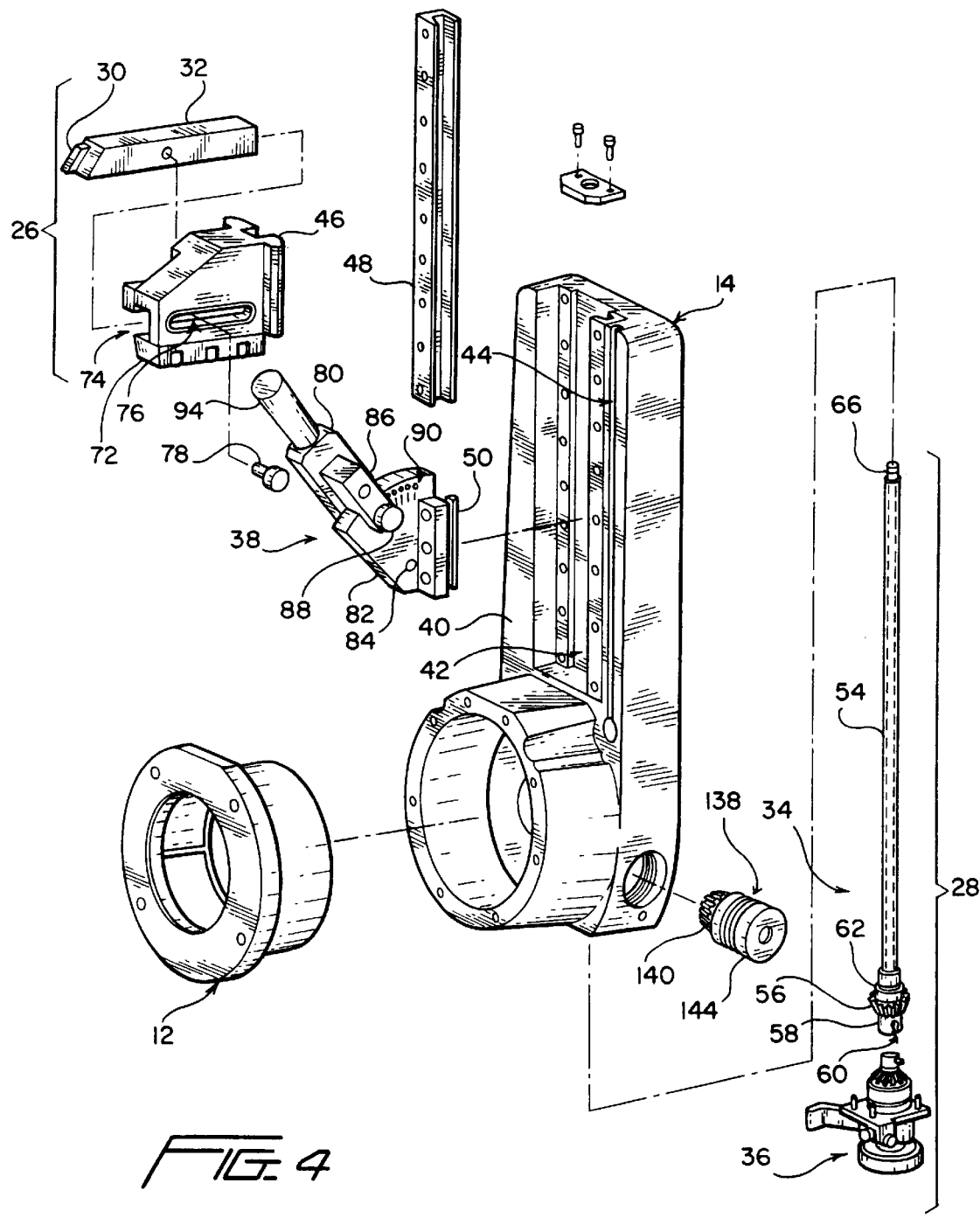
FIG. 4 is an exploded perspective view of the beveling tool according to FIG. 1 with the mandrel and drive portions omitted.

Referring to the preferred embodiment shown in FIG. 4, base member 14 has a front face 40. Front face 40 preferably includes a first radial channel 42 and a second radial channel 44. First radial channel 42 is arranged to receive the cutting tool holder assembly 26. As shown, the cutting tool holder assembly 26 preferably includes a slide rail mating portion 46 which is slidably mounted within a pair of slide rails 48 which are mounted within first radial channel 42. The tracking plate assembly 38 preferably includes a channel mounting portion 50 which is received in second radial channel 44 and is selectably positionable therein.

Base member 14 also includes an internal offset bore 52 (see FIG. 9) which opens into first radial channel 42. Received within internal offset bore 52 is a feed screw 54 which forms a part of the feed screw assembly 34. Feed screw 54 extends into first radial channel 42 and is rotatably connected to the cutting tool holder assembly 26 mounted within first radial channel 42.

Figure 9:
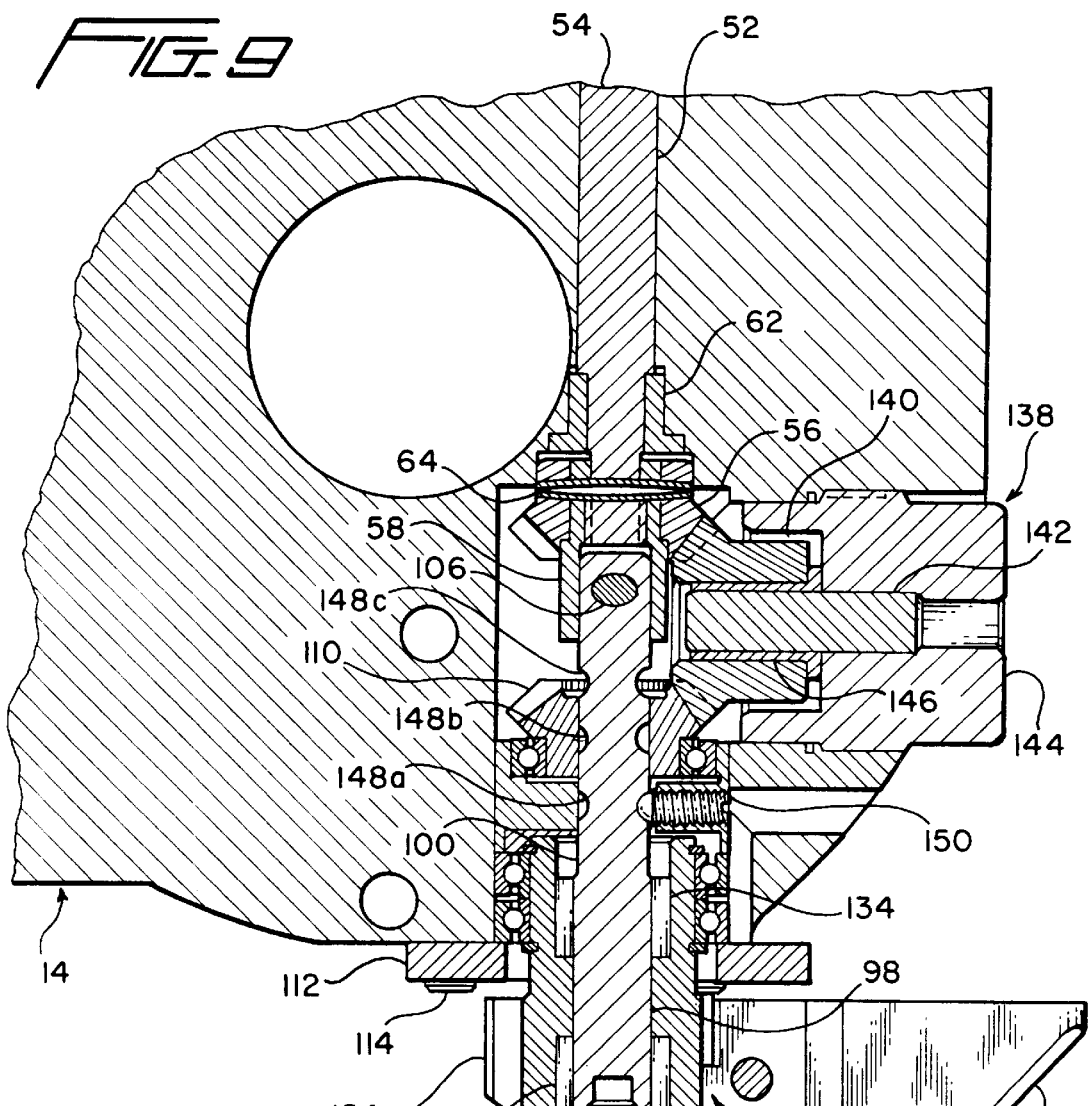
FIG. 9 is a sectional view of the feed lever assembly according to FIG. 7 mounted to a beveling tool according to the invention.

As shown in FIGS. 4 and 9, the feed screw assembly 34 includes feed screw 54, a forward drive gear 56, and a drive sleeve 58 with notches 60 formed on opposite sides. Forward drive gear 56 is mounted on a proximate end of feed screw 54 for rotation therewith, preferably via a flanged bushing 62 or the like. Drive sleeve 58 is mounted to forward drive gear 56 for rotation therewith, preferable via a roll pin 64 extending through forward drive gear 56 and drive sleeve 58. A distal end 66 of feed screw 54 is rotatably mounted to a feed thrust plate 68. Feed thrust plate 68 is mounted to base member 14 at an opened end of first radial channel 42 for receiving distal end 66 of feed screw 54. Feed thrust plate 68 may be mounted to base member 14 by one or more thrust plate screws 70, or any other suitable means.

Referring now to FIGS. 4 and 5, the cutting tool holder assembly 26 and the tracking plate assembly 38 are shown separately and assembled, respectively. The cutting tool holder assembly 26 comprises a main body portion 72 which defines a bore 74 for receiving cutting tool holder 32. Cutting tool holder 32 is slidably disposed within bore 74 with cutting tool 30 extending therefrom. An elongated axial slot 76 is formed on one side of main body portion 72. Axial slot 76 is aligned with and opens into bore 74. A cam follower 78 is connected to cutting tool holder 32 and extends through axial slot 76 to protrude therefrom.

It will be understood that the cutting tool holder assembly 26 includes some means for engaging feed screw 54. For example, the cutting tool holder assembly 26 may include a threaded axial bore adjacent slide rail mating portion 46 or may include a feed nut connected to main body portion 72, neither of which is illustrated in the drawings. Of course, all that is required is that the cutting tool holder assembly be connected to feed screw 54 so that rotation of feed screw 54 causes the cutting tool holder assembly 26 to move radially within first radial channel 42 and the cutting tool holder 32 to move axially within bore 74. The tracking plate assembly 38 shown is the preferred way to transmit the rotational motion of feed screw 54 into axial movement of cutting tool holder 32. Of course, any other suitable means, for example simple gearing, can be used.

Bore 74 and elongated axial slot 76 are formed in main body portion 72 of the cutting tool holder assembly 26 such that when the cutting tool holder assembly 26 is mounted to base member 14, bore 74 and axial slot 76 are aligned in an axial direction relative to rotation axis 16.

As shown in FIGS. 4 and 5, a preferred embodiment of the tracking plate assembly 38 includes a tracking plate 80 and an angle selection plate 82. Preferably, tracking plate 80 is connected to angle selection plate 82 by a pivot 84. In the preferred embodiment shown, an angle selection block 86 is mounted on tracking plate 80. Angle selection block 86 carries with it an angle selection pin 88 which is selectably engagable with a plurality of angle selection holds 90 formed in angle selection plate 82.

Figure 6:
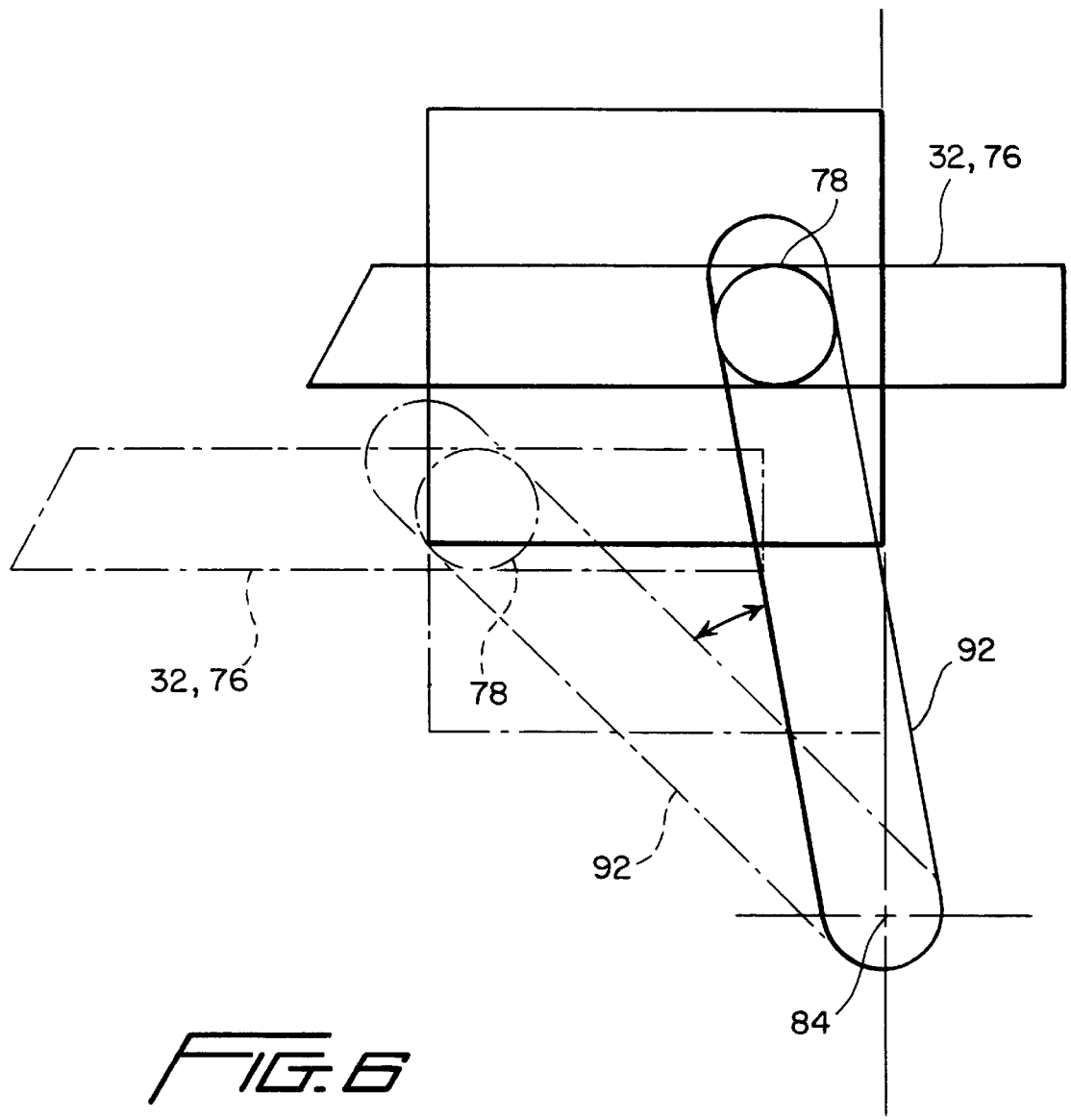
FIG. 6 is a schematic diagram illustrating the positioning and movement of the tracking plate assembly with respect to the cutting tool holder assembly according to FIG. 5.

An elongated tracking slot 92 is formed on one side of tracking plate 80. Tracking slot 92 is arranged to receive a part of cam follower 78 protruding from axial slot 76 when the cutting tool holder assembly 26 and the tracking plate assembly 38 are assembled and mounted on base member 14. The relative angle between tracking slot 92 and axial slot 76, and thus the beveling angle which the beveling tool will cut, may be varied via pivoting tracking plate 80 relative to angle selection plate 82 and selecting a desired angle by engaging one of the plurality of angle selection holes 90 with angle selection pin 88. FIG. 6 schematically illustrates the adjustment of the relative angle between tracking slot 92 and axial slot 76. In the preferred embodiment shown, a handle portion 94 may be provided on tracking plate 80 to facilitate pivoting tracking plate 80 relative to angle selection plate 82.

Referring now to FIGS. 7–9, a preferred embodiment of the feed lever assembly 36 is shown both separate from and mounted to base member 14. The feed lever assembly 36 comprises a body portion 96 having a central bore 98 for receiving a feed shaft 100 of a feed shaft assembly 102. Feed shaft assembly 102 includes feed shaft 100, a feed knob 104 and a feed pin 106. Feed pin 106 is secured to a proximate end of feed shaft 100 and protrudes radially therefrom. Feed knob 104 is connected to a distal end of feed shaft 100, for example, by a feed knob screw 108.

Mounted near the distal end of feed shaft 100 is a reverse drive gear 110 which rotates with the rotation of feed shaft 100. As shown in FIG. 9, reverse drive gear 110 and the feed lever assembly 36 are preferably bearing mounted to base member 14. Also, body portion 96 of the feed lever assembly 36 is preferably rotatably mounted within a thrust plate 112. Thrust plate 112 is preferably secured to base member 14, for example, by a plurality of cap screws 114.

Body portion 96 forms a feed lever body and has a feed lever arm 116 pivotally connected thereto to form a feed lever. The pivotal connection between feed lever arm 116 and body portion 96 is formed by a break-away hinge 118. Break-away hinge 118 preferably comprises a pivot screw 120 which extends through a portion of feed lever arm 116 and is secured to a portion of feed lever body 96 by a break-away hinge pin 122. Preferably, one or more Belleville (conical compression type spring) washers 121 is mounted between pivot screw 120 and feed lever arm 116. The inner end of feed lever arm 116 is provided with a groove (not shown) that receives a portion of break-away hinge pin 122. Thus, feed lever arm 116 is connected to hinge 118 through pin 122 so that lever arm 116 and hinge 118 move together as a unit provided that the force of the Belleville washers 121 is not overcome by excess force applied to feed lever arm 116. If excessive force resisting motion is encountered by feed lever arm 116, it will tend to move relative to hinge 118 by deforming Belleville washers 121 axially along pivot screw 120 to override pin 122 and pivot around pivot screw 120. This will leave lever arm 116 askew relative to hinge 118 so that it will not engage feed lever actuator 146 and no feed motion of cutting tool 30 will occur.

In the preferred embodiment shown, body portion 96 includes a throw indicator 124 and thrust plate 112 includes a corresponding series of throw graduation indicators 126 on a face thereof. Also, thrust plate 112 preferably includes a stop block 128 formed therewith. In the preferred embodiment shown, a first stop screw 130 and a second stop screw 132 are mounted on stop block 128 and extend therefrom in an adjustable manner. Stop block 128 is located appropriately on thrust plate 112 relative to feed lever arm 116 and feed lever body 96 so that first and second stop screws 130, 132 function as feed rate locking and adjusting screws by limiting the rotation of feed lever body 96.

As shown in FIG. 9, the feed lever assembly 36 preferably includes an in-feed clutch 134 and an out feed clutch 136. Both in-feed clutch 134 and out-feed clutch 136 are one-way clutches which are engaged one at a time by feed shaft 100 depending on the position of feed shaft 100, as will be explained hereinafter.

As shown in FIGS. 4 and 9, an idler gear assembly 138 is mounted within base member 14. The idler gear assembly 138 includes an idler gear 140 which is rotatably mounted on a dowel pin 142 connected to an idler gear plug 144. The idler gear assembly 138 preferably also includes a flange bushing 146 mounted between idler gear 140 and idler gear plug 144. When installed in base member 14, the idler gear 140 engages both forward and reverse drive gears 56, 110. Idler gear 140 is otherwise freely rotatable in either direction.

Having described the preferred embodiments of the various subassemblies of a portable single-point beveling tool according to the present invention, the features and advantages of its operation will be described.

As mentioned above, tool drive mechanism 1 8 is arranged to rotate base member 14 about rotation axis 16. Pipe 24, or other workpiece, is engaged by mandrel 20 for supporting the tool relative to the pipe. Pipe 24 and the tool are connected by mandrel 20 while base member 14 carrying cutting tool 30 is rotated about rotation axis 16 by drive mechanism 18.

As shown in FIG. 2, the tracking plate assembly 38 is moved within second radial channel 44 to an appropriate position, depending upon the size of the workpiece, and then secured to base member 14 at that position. A desired beveling angle is selected by pivoting tracking plate 80 relative to angle selection plate 82 and engaging angle selection pin 88 within a desired angle selection hole 90. Preferably, the angle between tracking slot 92 and axial slot 76 is adjustable from 0° to 45°. Of course, any desired range of adjustment is possible.

The position of feed shaft 100 is adjusted between one of three positions: in-feed, neutral and out-feed. Referring to FIG. 9, feed shaft 100 is shown in the in-feed position in which feed shaft 100 extends farthest into base member 14 such that feed pin 106 engages notches 60 on drive sleeve 58. The neutral position of feed shaft 100 positions feed pin 106 in the space between drive sleeve 58 and reverse drive gear 110 such that feed pin 106 rotates freely within that space. The out-feed position of feed shaft 100 positions feed pin 106 to engage reverse drive gear 110.

Feed shaft 100 includes three grooves or indentations 148a, 148b and 148c. These indentations 148a–c are selectively engaged by a ball detent 150 when feed shaft 100 is adjusted between the three positions. Thus, indentations 148a, 148b and 148c are engaged by ball detent 150 to position and hold feed shaft 100 in the in-feed, neutral and out-feed positions, respectively.

Figure 9A:
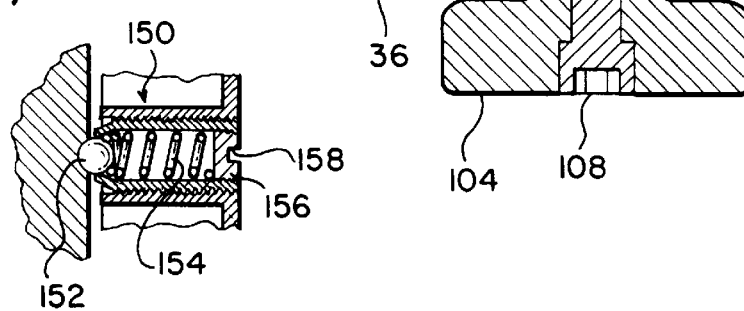

As shown in FIG. 9A, ball detent 150 includes a ball 152 which is biased toward feed shaft 100 by a detent spring 154. Ball detent 150 preferably also includes a threaded cap 156, with a slot 158 for engagement with a screwdriver (not shown), which abuts an end of detent spring 154 opposite ball 152. By screwing threaded cap 156 in or out, the biasing force applied by detent spring 154 on ball 152 can be adjusted to a desired amount for holding feed shaft 100 in position during operation of the tool.

The operation of beveling tool 10 with feed shaft 100 pushed into the in-feed position by feed knob 104 will be described first.

When base member 14 is rotated around rotation axis 16, feed lever arm 116 is brought into contact with a feed lever actuator 160 once every revolution of base member 14. As shown in FIG. 1, feed lever actuator 160 is mounted on a non rotating portion of beveling tool 10 in such a position that feed lever arm 116 comes into contact therewith. Of course, although only one feed lever actuator 160 is shown, more than one may be used if it is desired to trip feed lever arm 116 more than once per rotation of base member 14.

When feed lever arm 116 is tripped by feed lever actuator 160, it rotates feed shaft 100 a predetermined amount, for example set by first and second stop screws 130, 132 using throw indicator 124 and throw graduation indicators 126. The incremental rotation of feed shaft 100 incrementally rotates feed screw 54 via feed pin 106 and drive sleeve 58.

The incremental rotation of feed screw 54 drives the cutting tool holder assembly 26 radially towards rotation axis 16. The incremental movement of the cutting tool holder assembly 26 moves cam follower 78 relative to tracking plate 80.

Thus, as the cutting tool holder assembly 26 and cam follower 78 are incrementally moved radially, cam follower 78 is forced to move axially as well by tracking plate 80. This causes cutting tool holder 32 and cutting tool 30 to move both radially and axially a predetermined distance with each incremental turn of feed screw 54. This axial and radial movement of cutting tool 30 results in a beveled surface being cut on pipe 24 according to the desired beveled angle selected. In other words, while base member 14 is rotated about rotation axis 16, cutting tool 30 is rotated about rotation axis 16 along pipe 24 and is incrementally moved both axially and radially by the cutting tool feed assembly 28 to form the desired beveled surface on the end of pipe 24.

When feed shaft 100 is positioned in the out-feed position by pulling feed knob 104 to engage indentation 148c with ball detent 150, feed pin 106 engages reverse drive gear 110. In this case, when feed lever arm 116 contacts feed lever actuator 160 to incrementally rotate feed shaft 100, reverse drive gear 110 is rotated by feed pin 106. Reverse drive gear 110 engaged with idle gear 140 rotates idle gear 140. Idle gear 140 engaged with forward drive gear 56 thus rotates forward drive gear 56 in an opposite direction of rotation relative to the direction of rotation of reverse drive gear 110. Thus, feed screw 54 is rotated by forward drive gear 56 in the opposite direction of rotation. This causes the cutting tool holder assembly 26 to be incrementally radially moved away from rotation axis 16. Thus, beveling tool 10 may operate with the cutting tool holder assembly 26 radially moving in either direction.

When feed shaft 100 is positioned in the neutral position by feed knob 104 to engage indentation 148b with ball detent 150, feed shaft 100 does not engage anything and feed screw 54 is not rotated at all. The neutral position thus allows rotation of base member 14 without driving the cutting tool feed assembly 28.

Having thus described the operation of beveling tool 10, the purpose and function of break-away hinge 118 becomes clear. Break-away hinge 118 is designed to disable feed lever arm 116 from contacting feed lever actuator 160 to prevent damage to the cutting tool holder assembly 26 and the cutting tool feed assembly 28. If, for example, the cutting tool holder assembly 26 were to reach either end of first radial channel 42 within base member 14, or if cam follower 78 were to reach either end of axial slot 76 or tracking slot 92, contact of feed lever arm 116 against feed lever actuator 160 would cause arm 116 to override break-away hinge pin 122 to allow feed lever arm 116 to pivot about its pivot screw 120 so that feed lever arm 116 will no longer contact feed lever actuator 160 upon rotation of base member 14. Thus, if an excessive force is applied to feed lever arm 116, break-away hinge 118 will prevent the excessive force from being transmitted to the various assemblies of the beveling tool.

It is also possible to prevent contact of feed lever arm 116 with feed lever actuator 160 by making feed lever actuator 160 adjustable in height. For example, feed lever actuator 160 may be adjustable between two height settings, one setting in which feed lever arm 116 will contact feed lever actuator 160 and another setting in which feed lever arm 116 will clear feed lever actuator 160.

The present invention is by no means restricted to the above-described preferred embodiments, but on the contrary covers all variations that might be implemented by using equivalent functional elements or devices that would be apparent to a person skilled in the art, or modifications that fall within the spirit and scope of the appended claims.

I claim:

1. A portable single-point beveling tool, comprising:
    a tool housing;
    a tool drive mechanism associated with the housing;
    a base member rotatably supported on the housing for rotary motion about a rotation axis and arranged to be rotated by the tool drive mechanism, the base member including a portion extending in a generally radial direction with respect to the rotation axis;
    a cutting tool holder assembly carried by the base member portion, the cutting tool holder assembly including a cutting tool holder; and
    a cutting tool feed assembly carried by the base member and arranged to simultaneously drive the cutting tool holder assembly in a linear radial direction and the cutting tool holder in a linear axial direction with respect to the rotation axis, the cutting tool feed assembly being actuated by rotary motion of the base member.

2. The portable single-point beveling tool according to claim 1, wherein the cutting tool feed assembly comprises:
    a feed screw assembly including a feed screw; and
    a feed lever assembly including a feed lever which is actuated by rotary motion of the base member, the feed lever assembly being selectably engageable with the feed screw assembly so as to rotate the feed screw a desired increment each time the feed lever is actuated;
    wherein the feed screw is rotatably connected to the cutting tool holder assembly such that rotation of the feed screw drives the cutting tool holder assembly in a linear radial direction.

3. The portable single-point beveling tool according to claim 1, further comprising:
    a tracking plate assembly carried by the base member portion, the tracking plate assembly including a tracking plate having a tracking slot;
    an axial slot formed on a side of the cutting tool holder assembly;
    a cam follower connected to the cutting tool holder which extends through the axial slot and into the tracking slot such that movement of the cam follower is constrained by the axial and tracking slots, whereby the cutting tool holder is driven in the linear axial direction by movement of the cam follower within the axial and tracking slots when the cutting tool holder assembly is driven in the linear radial direction.

4. The portable single-point beveling tool according to claim 3, wherein the tracking slot is fixedly positionable at a plurality of angles relative to the axial slot.

5. The portable single-point beveling tool according to claim 3, wherein the tracking plate assembly further comprises:
    an angle selection plate to which the tracking plate is pivotably attached, the tracking plate being fixedly positionable on the angle selection plate, whereby the tracking slot is fixedly positionable at a plurality of angles relative to the axial slot.

6. The portable single-point beveling tool according to claim 5, further comprising:
    a plurality of angle selection holes formed on the angle selection plate; and
    an angle selection pin connected to the tracking plate, the angle selection pin being selectively engageable with the plurality of angle selection holes.

7. The portable single-point beveling tool according to claim 3, wherein the tracking plate assembly is adjustably mountable in a radial direction on the base member portion.

8. The portable single-point beveling tool according to claim 3, further comprising:
    a radially disposed mounting channel formed in the base member portion; and
    a channel mounting portion on the tracking plate assembly which is adjustably mountable within the mounting channel.

9. The portable single-point beveling tool according to claim 1, further comprising:
    a radial channel formed in a front face of the base member portion; and
    a pair of slide rails disposed at opposite sides of the radial channel;

wherein the cutting tool holder assembly includes slide rail mating portions which cooperate with the slide rails to guide the cutting tool holder assembly along the front face of the base member portion in a linear radial direction.

10. The portable single-point beveling tool according to claim 2, further comprising:

a radial channel formed in a front face of the base member portion;

a pair of slide rails disposed at opposite sides of the radial channel; and an internal offset radial bore formed in the base member portion, the radial bore opening into the radial channel and receiving at least a portion of the feed screw assembly;

wherein the cutting tool holder assembly includes slide rail mating portions which cooperate with the slide rails to guide the cutting tool holder assembly along the front face of the base member portion in the linear radial direction.

11. The portable single-point beveling tool according to claim 2, further comprising:

at least one feed lever actuator mounted on the tool housing and positioned to actuate the feed lever assembly by contacting the feed lever during rotary motion of the base member portion and causing the feed lever to rotate a predetermined amount.

12. The portable single-point beveling tool according to claim 11, wherein the at least one feed lever actuator is movable between a feed lever contacting position and a feed lever non-contacting position.

13. The portable single-point beveling tool according to claim 2, wherein the feed lever assembly further comprises:

at least one one-way clutch mounted on the feed lever;

a feed shaft which is driven by the feed lever via the at least one-way clutch to rotate in a first direction only; and an in-feed gear connected to the feed screw of the feed screw assembly, wherein the in-feed gear is engageable by the feed shaft to rotate the feed screw the desired increment each time the feed lever is actuated.

14. The portable single-point beveling tool according to claim 13, wherein the feed lever assembly further comprises:

an out-feed gear mounted around the feed shaft and selectably engageable thereby;

an idler gear meshed with both the in-feed gear and the out-feed gear; and a feed knob connected to the feed shaft and arranged to radially move the feed shaft between an in-feed position and an out-feed position, the in-feed position being a position in which the feed shaft engages the in-feed gear only to drive the feed screw in the first direction, the out-feed position being a position in which the feed shaft engages the out-feed gear only to drive the feed screw in a second opposite direction via the idler gear and the in-feed gear.

15. The portable single-point beveling tool according to claim 11, wherein the feed lever further comprises:

a feed lever body;

a feed lever arm; and a hinge arrangement connecting the feed lever arm to the feed lever body, the hinge arrangement providing a predetermined resistance to relative movement between the feed lever arm and the feed lever body such that the feed lever arm is allowed to rotate relative to the feed lever body into a feed lever actuator non-contacting position when an excessive force is applied to the feed lever arm by the feed lever actuator.

16. The portable single-point beveling tool according to claim 15, wherein the hinge arrangement comprises:

a pivot screw connected to the feed lever body and about which the feed lever arm is rotatable;

a hinge pin releasably connecting the feed lever body and the feed lever arm to provide predetermined resistance to movement between the feed lever arm and the feed lever body; and at least one compression spring retained between the pivot screw and the feed lever arm biasing the feed lever arm against the hinge pin;

whereby feed lever arm reaction force sufficient to drive the feed lever arm over the hinge pin against the bias of the compression spring permits the feed lever arm to be displaced relative to the feed lever body.

17. The portable single-point beveling tool according to claim 2, wherein the feed lever assembly further comprises:

a non-rotating stop block;

a first stop screw adjustably mounted to the stop block to limit rotation of the lever arm in a first direction; and a second stop screw adjustably mounted to the stop block to limit rotation of the lever arm in a second opposite direction, whereby the first and second stop screws are adjusted to select a throw of the feed lever and thereby select a feed rate of the feed screw.

18. The portable single-point beveling tool according to claim 17, wherein the feed lever assembly further comprises:

a non-rotating thrust plate on which the stop block is mounted;

a throw indicator disposed on the feed lever; and a series of corresponding throw graduation indicators disposed on the thrust plate.

19. The portable single-point beveling tool according to claim 14, further comprising:

a ball detent mounted in the base member portion in contact with the feed shaft; and at least two indentations formed on the feed shaft which are selectably engageable by the ball detent to position and hold the feed shaft in the in-feed position and the out-feed position, respectively.

20. The portable single-point beveling tool according to claim 19, wherein the ball detent includes a detent spring whose biasing force is adjustable.

* * * * *